United States Patent
Matsumura et al.

(10) Patent No.: US 11,921,004 B2
(45) Date of Patent: Mar. 5, 2024

(54) METHOD FOR DETECTING DECREASED PRELOAD IN BALL SCREW AND LINEAR MOTION DRIVE DEVICE

(71) Applicant: NSK LTD., Tokyo (JP)

(72) Inventors: Keisuke Matsumura, Fujisawa (JP); Yushi Ootani, Tokyo (JP); Satoshi Hashimoto, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/275,296

(22) PCT Filed: Oct. 16, 2019

(86) PCT No.: PCT/JP2019/040729
§ 371 (c)(1),
(2) Date: Mar. 11, 2021

(87) PCT Pub. No.: WO2020/090479
PCT Pub. Date: May 7, 2020

(65) Prior Publication Data
US 2022/0099526 A1    Mar. 31, 2022

(30) Foreign Application Priority Data
Oct. 29, 2018  (JP) ................................ 2018-202722

(51) Int. Cl.
*G01M 13/028*  (2019.01)
*F16H 25/22*  (2006.01)

(52) U.S. Cl.
CPC ...... *G01M 13/028* (2013.01); *F16H 25/2204* (2013.01)

(58) Field of Classification Search
CPC ...... F16H 25/22; F16H 25/2204; F16H 57/01; F16H 2057/012; G01H 1/003; G01H 1/10;
(Continued)

(56) References Cited

U.S. PATENT DOCUMENTS 7,184,930 B2 *  2/2007  Miyasaka ............. G01M 17/10
                                                         384/445
7,860,663 B2 *  12/2010  Miyasaka ............. F16C 19/527
                                                         73/659
(Continued)

FOREIGN PATENT DOCUMENTS

JP    2007-108189 A    4/2007
JP    2009-198398 A    9/2009
(Continued)

OTHER PUBLICATIONS

English machine translation of JP-2018017689-A (Year: 2018).*
(Continued)

*Primary Examiner* — Lee E Rodak
*Assistant Examiner* — Martin Walter Braunlich
(74) *Attorney, Agent, or Firm* — Sughrue Mion, PLLC

(57) ABSTRACT

A linear motion drive device including a ball screw, a linear motion table driven by the ball screw to move linearly, and an abnormality detection device configured to detect a decrease in a preload applied to the ball screw. The abnormality detection device includes a vibration sensor configured to measure vibration during operation of the ball screw, a calculation processing unit configured to acquire a vibration value of a vibration signal in a specific frequency band among vibration signals measured by the vibration sensor, and an abnormality detection unit configured to determine that a decrease in the preload has occurred in the ball screw when the vibration value is less than a previously determined threshold with respect to a reference value, the reference value being a vibration value in an initial stage of the operation of the ball screw or during a normal operation of the ball screw.

19 Claims, 3 Drawing Sheets

(58) Field of Classification Search
CPC .............. G01M 13/028; G01M 13/045; F05D 2270/334
See application file for complete search history.

(56) References Cited

U.S. PATENT DOCUMENTS

2013/0220042 A1* 8/2013 Yokoyama .............. F16H 25/24
                                                    74/89.32
2014/0229125 A1   8/2014 Cheng et al.
2015/0354690 A1* 12/2015 Cheng ................... G01N 29/46
                                                    73/587

FOREIGN PATENT DOCUMENTS

| JP | 2009198398 A | * | 9/2009 | | |
|----|----|----|----|----|----|
| JP | 2010-038567 A | | 2/2010 | | |
| JP | 2012-229953 A | | 11/2012 | | |
| JP | 2013-257253 A | | 12/2013 | | |
| JP | 2015-230097 A | | 12/2015 | | |
| JP | 2018-017689 A | | 2/2018 | | |
| JP | 2018017689 A | * | 2/2018 | | |
| WO | WO-2017159037 A1 | * | 9/2017 | .............. | B62D 3/12 |

OTHER PUBLICATIONS

Extended European Search Report dated Nov. 18, 2021, issued by the European Patent Office in application No. 19880076.5.
Teruo Igarashi et al., "Studies on the Sound and Vibration of a Ball Screw: 4th Report, Effects of Various Factors on Sound of a Ball Screw", Transactions of the Japan Society of Mechanical Engineers Series C, 1993, pp. 3907-3913, vol. 59, No. 568.
Yasushi Tokunaga et al., "Studies on the Sound and Vibration of a Ball Screw (3rd Report, Sound Caused by Waviness on Flank of Screw Shaft", Transactions of the Japan Society of Mechanical Engineers Series C, 1992, pp. 1874-1879, vol. 58, No. 550.
International Search Report of PCT/JP2019/040729 dated Dec. 24, 2019 [PCT/ISA/210].

* cited by examiner

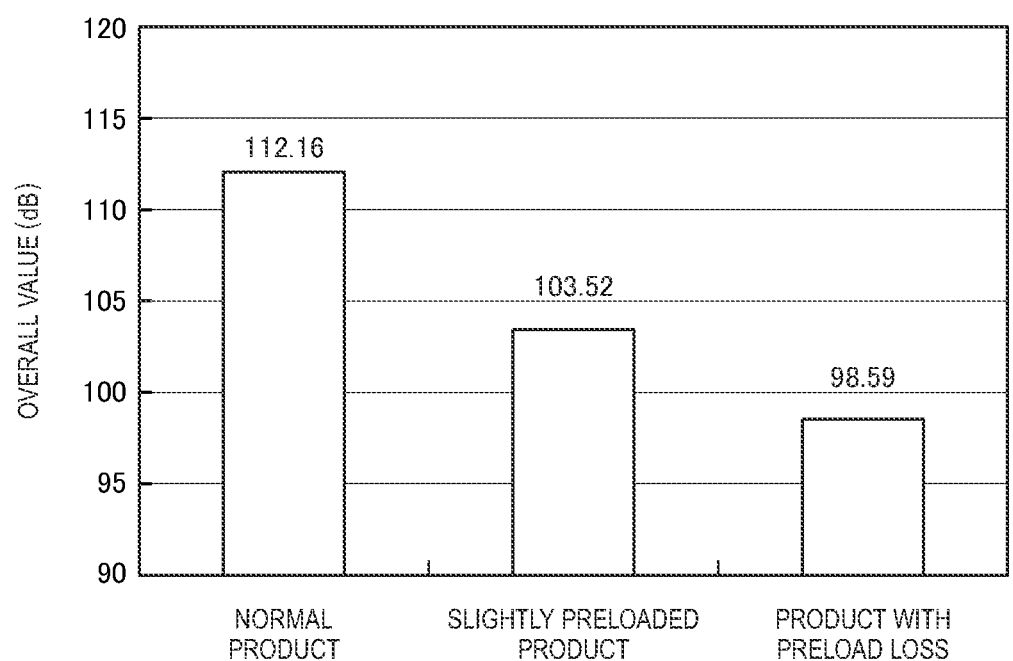

METHOD FOR DETECTING DECREASED PRELOAD IN BALL SCREW AND LINEAR MOTION DRIVE DEVICE

CROSS REFERENCE TO RELATED APPLICATIONS

This application is a National Stage of International Application No. PCT/JP2019/040729 filed on Oct. 16, 2019, claiming priority based on Japanese Patent Application No. 2018-202722 filed on Oct. 29, 2018.

TECHNICAL FIELD

The present invention relates to a method for detecting decreased preload in a ball screw and a linear motion drive device.

BACKGROUND ART

There are proposed various methods for detecting abnormality of a ball screw. For example, PTL 1 discloses a method for detecting an abnormality occurring in a ball screw by measuring vibration during operation of the ball screw, performing frequency analysis on a vibration signal of a frequency band equal to or less than the natural frequency of a ball screw nut among the obtained vibration signals, and comparing with a ball screw that is a normal product.

In addition, PTL 2 discloses a method for detecting abnormalities, such as a ball scratch and a ball peeling, occurring in a ball screw by measuring vibration during operation of the ball screw and comparing a 2nfb component in a specific frequency band synchronized with a rotational speed of a ball screw shaft with that of a ball screw that is a normal product.

Furthermore, PTL 3 discloses a method for detecting vanishing of preload in a ball screw by detecting an operating signal of the ball screw, converting the operating signal into a ball-passing signal, and comparing the ball-passing signal with a predetermined threshold.

However, performing abnormality detection by the methods disclosed in PTL 1, 2, and 3 requires prior calculations of a shaft rotation frequency, a ball revolution cycle, a ball rotation cycle, the ball-passing signal, and the like, which are matched with specifications of the ball screw. Additionally, since the methods disclosed in PTL 1 and 2 require the comparison of the vibration signal of the ball screw that is a test product with the vibration signal of the ball screw that is the normal product, it is necessary to acquire the vibration signal of the ball screw that is the normal product. Furthermore, the methods disclosed in PTL 1 and 2 are intended to detect damage, such as indentation and peeling, occurring in components such as a ball, and do not consider detection of decreased preload that occurs due to wear or the like.

CITATION LIST

Patent Literature

PTL 1: JP 2010-38567 A
PTL 2: JP 2012-229953 A
PTL 3: JP 2015-230097 A

SUMMARY OF INVENTION

Technical Problem

It is an object of the present invention to provide a method for detecting a decrease in a preload applied to a ball screw and a linear motion drive device including a ball screw and capable of detecting decreased preload.

Solution to Problem

According to an aspect of the present invention, there is provided a method for detecting decreased preload in a ball screw, which is a method for detecting a decrease in a preload applied to the ball screw, the method including: a vibration measurement step of measuring vibration during operation of the ball screw; a calculation processing step of acquiring a vibration value of a vibration signal in a specific frequency band among vibration signals obtained at the vibration measurement step; and an abnormality detection step of determining that a decrease in the preload has occurred in the ball screw when the vibration value is less than a previously determined threshold with respect to a reference value, the reference value being a vibration value in an initial stage of the operation of the ball screw or during a normal operation of the ball screw.

According to another aspect of the present invention, there is provided a linear motion drive device including a ball screw, a linear motion unit configured to be driven by the ball screw to move linearly, and an abnormality detection device configured to detect a decrease in a preload applied to the ball screw, wherein the abnormality detection device includes a vibration sensor configured to measure vibration during operation of the ball screw, a calculation processing unit configured to acquire a vibration value of a vibration signal in a specific frequency band among vibration signals measured by the vibration sensor, and an abnormality detection unit configured to determine that a decrease in the preload has occurred in the ball screw when the vibration value is less than a previously determined threshold with respect to a reference value, the reference value being a vibration value in an initial stage of the operation of the ball screw or during a normal operation of the ball screw.

Advantageous Effects of Invention

According to the present invention, it is possible to detect a decrease in a preload applied to a ball screw.

BRIEF DESCRIPTION OF DRAWINGS

FIG. 3 is a graph illustrating overall values of the ball screws that are the normal product, the slightly preloaded product, and the product with preload loss.

DESCRIPTION OF EMBODIMENTS

Figure 1:
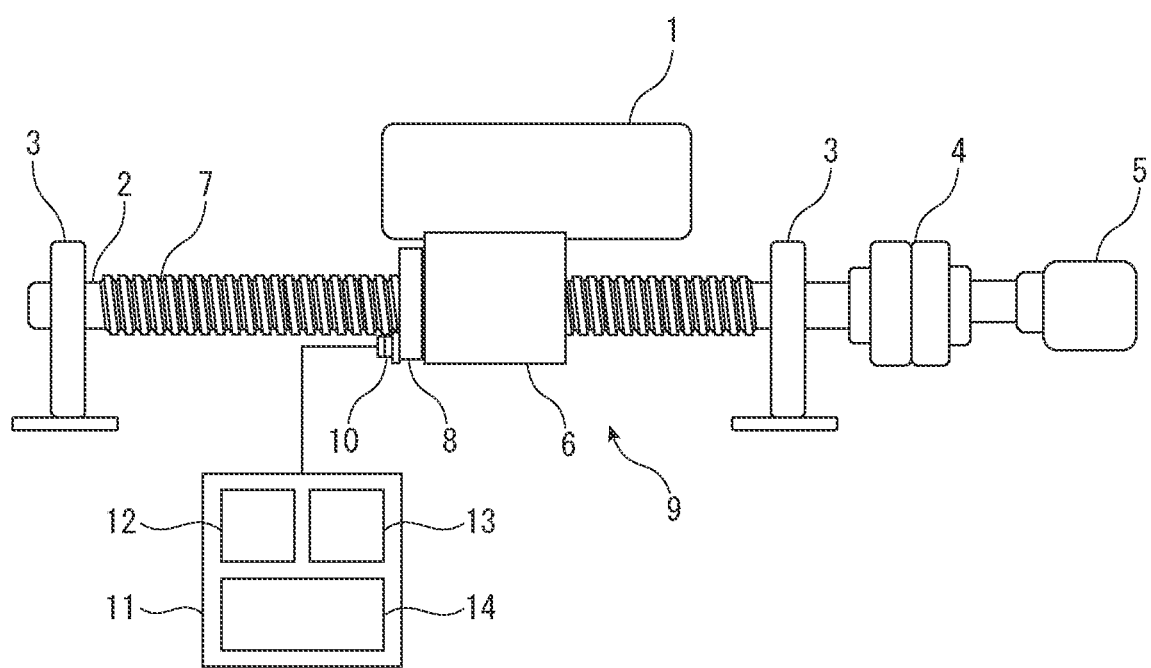
FIG. 1 is a diagram illustrating an embodiment of a linear motion drive device according to the present invention.

An embodiment of the present invention will be described in detail with reference to FIG. 1. FIG. 1 is a schematic structural diagram of a linear motion drive device including a ball screw and capable of detecting decreased preload.

The linear motion drive device of FIG. 1 includes a ball screw 9, a linear motion table 1 (corresponding to a linear motion unit that is a constituent feature of the present invention) configured to be driven by the ball screw 9 to move linearly, and an abnormality detection device 11 configured to detect a decrease in a preload applied to the ball screw 9.

Additionally, the abnormality detection device 11 includes a vibration sensor 10 configured to measure vibration during operation of the ball screw 9, a calculation processing unit 12 configured to acquire a vibration value (for example, an overall value) of a vibration signal in a specific frequency band among vibration signals measured by the vibration sensor 10, and an abnormality detection unit 13 configured to determine that a decrease in the preload has occurred in the ball screw 9 when the vibration value is less than a previously determined threshold with respect to a reference value, which is a vibration value in an initial stage of the operation of the ball screw 9 or during a normal operation thereof. The vibration sensor 10, the calculation processing unit 12, and the abnormality detection unit 13 may be integrated to form an abnormality detection device 11 or may be provided separately.

The linear motion drive device linearly moves the linear motion table 1 back and forth in left and right directions in FIG. 1. A ball screw shaft 2 of the ball screw 9 is arranged with an axial line thereof oriented in the left and right directions in FIG. 1. Axial both end portions of the ball screw shaft 2 are rotatably supported by support bearings 3 and 3, and an unillustrated bearing member, such as a rolling bearing, is mounted at a contact portion where each of the support bearings 3 contacts with the ball screw shaft 2. Additionally, one end portion (a right end portion in FIG. 1) of the axial both end portions of the ball screw shaft 2 is connected to an electric motor 5 via a coupling 4.

The ball screw shaft 2 is inserted into an inside of a substantially cylindrical ball screw nut 6. A ball rolling groove 7 having, for example, a substantially semicircular cross section is continuously formed in a spiral manner on an outer circumferential surface of the ball screw shaft 2, and a ball rolling groove (unillustrated) having, for example, a substantially semicircular cross section is continuously formed in a spiral manner on an inner circumferential surface of the ball screw nut 6 facing the outer circumferential surface of the ball screw shaft 2. The ball rolling groove 7 of the ball screw shaft 2 and the ball rolling groove of the ball screw nut 6 are arranged facing each other, so that a ball rolling path (unillustrated) is formed between both ball rolling grooves. In addition, in the ball rolling path, there are arranged a large number of balls (unillustrated) that roll in accordance with rotational movement of the ball screw shaft 2 or the ball screw nut 6. Furthermore, inside the ball screw nut 6 is formed also a ball return path (unillustrated) for scooping up the balls in the ball rolling path, returning the balls into the ball rolling path again, and circulating the balls therethrough.

A flange 8 is provided at an axial one end portion of the ball screw nut 6, and the flange 8 is fixed to the linear motion table 1. When the electric motor 5 is rotated while the rotation of the linear motion table 1 and the ball screw shaft 2 of the ball screw nut 6 around the shaft is restricted, the ball screw shaft 2 is rotationally driven. Then, as the balls in the ball rolling path roll, the ball screw nut 6 and the linear motion table 1 linearly move in the left and right directions in FIG. 1.

In the ball screw 9 including the ball screw shaft 2, the ball screw nut 6, the balls, and the like, vibration occurs in conjunction with the rolling of the balls. In the present embodiment, the vibration sensor (a vibration acceleration sensor) 10 is mounted on the flange 8 of the ball screw nut 6 to detect an abnormality in the ball screw 9 from a vibration signal detected by the vibration sensor 10. Note that the vibration signal detected by the vibration sensor 10 is waveform data. In addition, the mounting location for the vibration sensor 10 is not limited to the flange 8 of the ball screw nut 6, and may be any place that allows detection of a vibration acceleration in a moving direction of the linear motion table 1, i.e., in a direction in which the ball screw nut 6 moves forward. However, the place where the vibration sensor 10 can be mounted is either the ball screw nut 6 or the linear motion table 1.

Vibration that has occurred during operation of the ball screw 9 is measured by the vibration sensor 10 (a vibration measurement step), and the measured vibration signals are sent to the calculation processing unit 12 in which predetermined calculation processing is performed. Specifically, among the vibration signals measured by the vibration sensor 10, a vibration value of a vibration signal in a specific frequency band is acquired by the calculation processing by the calculation processing unit 12 (a calculation processing step). The following description will exemplify a case where an overall value is acquired as the vibration value. The overall value means a sum of vibration signals in a specific frequency band. However, an RMS value (an effective value) or an average value may be acquired as the vibration value. Note that the average value means a value obtained by subjecting the vibration signal to absolute value processing and then averaging processing.

The acquired overall value is sent to the abnormality detection unit 13. Then, when the overall value is less than a previously determined threshold, the abnormality detection unit 13 determines that a decrease in the preload has occurred in the ball screw 9 (an abnormality detection step). Monitoring the overall value enables it to surely detect that the preload applied to the ball screw 9 is lower than in the initial stage of the operation of the ball screw 9. For example, it is possible to detect a state where the preload applied to the ball screw 9 has become slightly lower than in the initial stage of the operation of the ball screw 9 or a state where the preload has decreased even to zero (preload loss).

Decreased preload due to wear does not cause a rise in the vibration signal. Therefore, the methods for detecting the rise in the vibration signal disclosed in PTL 1 and 2 cannot detect decreased preload due to wear. On the other hand, the method for detecting decreased preload in a ball screw according to the present embodiment can ensure detection of decreased preload by monitoring the overall value as the vibration value. Additionally, the method for detecting decreased preload in a ball screw according to the present embodiment does not require obtaining of the specifications of the ball screw, and furthermore does not require prior calculations of a shaft rotation frequency, a ball revolution cycle, a ball rotation cycle, a ball-passing signal, and the like, which are matched with the specifications of the ball screw.

Such a method for detecting decreased preload in a ball screw and the linear motion drive device according to the present embodiment do not require any special device and allow the use of the existing vibration measuring device to detect decreased preload. Thus, the method for detecting decreased preload in a ball screw and the linear motion drive device according to the present embodiment are suitable for, for example, machine tools, transportation devices, production equipment, and the like.

The specific frequency band can be, for example, a low frequency band of from 10 Hz to 10 kHz, which is susceptible to influence of a natural frequency of the ball screw shaft. Frequency bands exceeding 10 kHz are easily affected by circulation vibration of the rolling bodies, which causes noise and reduces detection accuracy. Thus, by monitoring an overall value in such a low frequency band, decreased preload due to wear can be detected more surely.

In addition, the threshold is not particularly limited, but may be set with reference to an overall value in the initial stage of the operation of the ball screw 9. For example, at the vibration measurement step, vibration during operation of the ball screw 9 is chronologically measured by the vibration sensor 10. Additionally, at the calculation processing step, an overall value is chronologically acquired by the calculation processing unit 12. At the abnormality detection step, each chronologically acquired overall value is compared with the overall value in the initial stage of the operation of the ball screw 9 by the abnormality detection unit 13 as needed. Then, when the difference exceeds a previously determined set value, it may be determined that a decrease in the preload has occurred in the ball screw 9. The above set value may be set as appropriate so as to ensure that decreased preload can be detected. For example, the set value may be set to a value obtained by multiplying an average value of overall values measured multiple times during a predetermined period of time in the initial stage of the operation of the ball screw 9 by a coefficient.

When comparing the chronologically acquired overall values with the overall value in the initial stage of the operation of the ball screw 9 by the abnormality detection unit 13, the overall value in the initial stage of the operation of the ball screw 9 may be stored in advance by a storage unit 14. Then, the overall value in the initial stage of the operation of the ball screw 9 may be recalled into the abnormality detection unit 13 from the storage unit 14, and the abnormality detection unit 13 may compare the overall value with the chronologically acquired overall values to determine whether or not a decrease in the preload has occurred in the ball screw 9.

Figure 2:
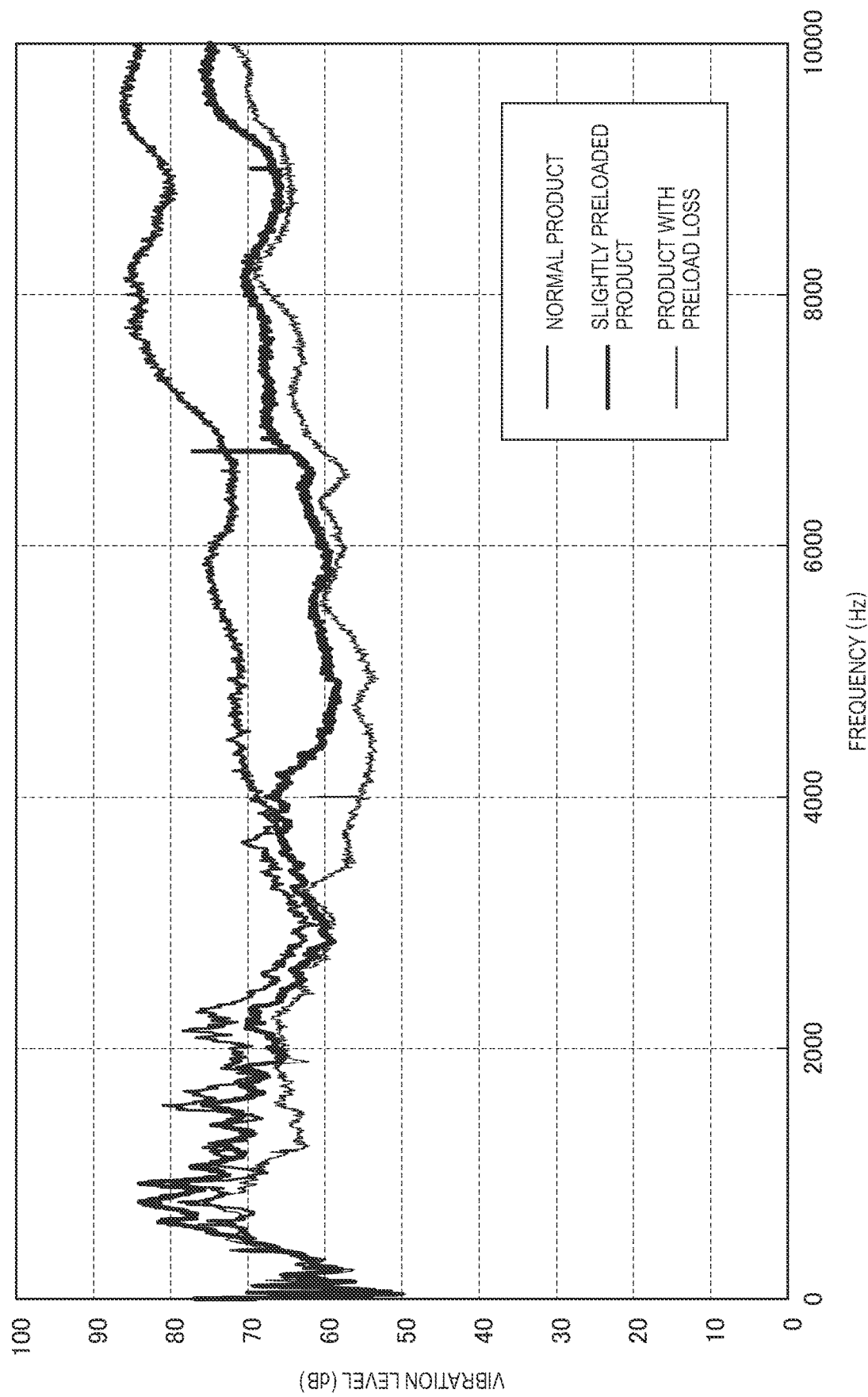
FIG. 2 is a graph illustrating vibration signals of ball screws that are a normal product, a slightly preloaded product, and a product with preload loss.

FIG. 2 illustrates vibration signals measured by the vibration sensor during operation of the ball screw. In FIG. 2, the "normal product" is an unused ball screw with no decreased preload due to no wear, and a vibration signal in the initial stage of the operation is measured. Additionally, the "slightly preloaded product" in FIG. 2 is a used ball screw with decreased preload due to occurrence of wear, and a vibration signal slightly lower than in the initial stage of the operation is measured. Furthermore, the "product with preload loss" in FIG. 2 is a ball screw whose preload has decreased to zero due to wear, and a vibration signal lower than in the initial stage of the operation is measured. Note that FIG. 2 illustrates vibration signals of a frequency band of from 0 kHz to 10 kHz.

As can be seen in FIG. 2, in the frequency band of from 10 Hz to 10 kHz, vibration signal reduction due to the decreased preload was observed, and the degree of the vibration signal reduction was larger in the product with preload loss than in the slightly preloaded product.

FIG. 3 illustrates overall values of the ball screws that are the normal product, the slightly preloaded product, and the product with preload loss exemplified in FIG. 2. FIG. 3 indicates that a decrease in preload such as preload loss due to wear in the ball screw can be detected by the overall values in the frequency band of from 10 Hz to 10 kHz.

Note that, in the ball screw after feeding a lubricant, it is preferable to detect wear and decreased preload by performing a running-in operation to eliminate influence of the lubrication on the vibration and measuring a vibration value after the vibration converges to a constant value.

REFERENCE SIGNS LIST

1: Linear motion table
2: Ball screw shaft
3: Support bearing
4: Coupling
5: Electric motor
6: Ball screw nut
7: Ball rolling groove
8: Flange
9: Ball screw
10: Vibration sensor
11: Abnormality detection device
12: Calculation processing unit
13: Abnormality detection unit
14: Storage unit

The invention claimed is:

1. A method for detecting decreased preload in a ball screw, which is a method for detecting a decrease in a preload applied to the ball screw, the method comprising:
　　a vibration measurement step of measuring vibration during operation of the ball screw;
　　a calculation processing step of acquiring a vibration value of a vibration signal in a specific frequency band among vibration signals obtained at the vibration measurement step; and
　　an abnormality detection step of determining that a decrease in the preload has occurred in the ball screw when the vibration value is less than a threshold determined based on a vibration value in an initial stage of the operation of the ball screw or during a normal operation of the ball screw,
　　wherein the specific frequency band is less than 10 kHz and is set based on and includes a natural frequency of the ball screw,
　　wherein the ball screw comprises a ball screw shaft which is rotatably supported by rolling bodies of support bearings at axial ends of the ball screw shaft,
　　wherein the ball screw further comprises:
　　　　at least one of a nut and a linear motion table; and
　　　　an acceleration sensor attached to the at least one of the nut and linear motion table, and
　　wherein the vibration measurement step of measuring the vibration during the operation of the ball screw comprises measuring the vibration by the acceleration sensor.

2. The method for detecting decreased preload in theft ball screw according to claim 1, wherein at the calculation processing step, the vibration value is chronologically acquired, and at the abnormality detection step, a comparison between the acquired vibration value and the vibration value in the initial stage of the operation of the ball screw is performed as needed, and when a difference between the vibration values exceeds a previously determined set value, it is determined that a decrease in the preload has occurred in the ball screw.

3. The method for detecting decreased preload in the ball screw according to claim 1, wherein the specific frequency band is a frequency band of from 10 Hz to 10 kHz.

4. The method for detecting decreased preload in the ball screw according to claim 1, wherein at the calculation processing step, at least one of an overall value, an RMS value, and an average value is acquired as the vibration value.

5. A linear motion drive device comprising a ball screw, a linear motion table of the ball screw to be driven by the ball screw to move linearly, and an abnormality detection device configured to detect a decrease in a preload applied to the ball screw, wherein the abnormality detection device includes a vibration sensor configured to measure vibration during operation of the ball screw, a calculation processing unit configured to acquire a vibration value of a vibration signal in a specific frequency band among vibration signals measured by the vibration sensor, and an abnormality detection unit configured to determine that a decrease in the preload has occurred in the ball screw when the vibration value is less than a threshold determined based on a vibration value in an initial stage of the operation of the ball screw or during a normal operation of the ball screw, wherein the specific frequency band is less than 10 kHz and is set based on and includes a natural frequency of the ball screw, wherein the ball screw comprises a ball screw shaft which is rotatably supported by rolling bodies of support bearings at axial ends of the ball screw shaft, wherein the ball screw further comprises a nut, and wherein the vibration sensor is an acceleration sensor attached to the at least one of the nut and the linear motion table.

6. The linear motion drive device according to claim 5, wherein the abnormality detection device is configured to allow the calculation processing unit to chronologically acquire the vibration value and allow the abnormality detection unit to perform, as needed, a comparison between the acquired vibration value and the vibration value in the initial stage of the operation of the ball screw and determine that a decrease in the preload has occurred in the ball screw when a difference between the vibration values exceeds a previously determined set value.

7. The linear motion drive device according to claim 5, wherein the specific frequency band is a frequency band of from 10 Hz to 10 kHz.

8. The linear motion drive device according to claim 5, wherein the calculation processing unit acquires at least one of an overall value, an RMS value, and an average value as the vibration value.

9. The method for detecting decreased preload in the ball screw according to claim 2, wherein the specific frequency band is a frequency band of from 10 Hz to 10 kHz.

10. The method for detecting decreased preload in the ball screw according to claim 2, wherein at the calculation processing step, at least one of an overall value, an RMS value, and an average value is acquired as the vibration value.

11. The method for detecting decreased preload in the ball screw according to claim 3, wherein at the calculation processing step, at least one of an overall value, an RMS value, and an average value is acquired as the vibration value.

12. The method for detecting decreased preload in the ball screw according to claim 9, wherein at the calculation processing step, at least one of an overall value, an RMS value, and an average value is acquired as the vibration value.

13. The linear motion drive device according to claim 6, wherein the specific frequency band is a frequency band of from 10 Hz to 10 kHz.

14. The linear motion drive device according to claim 6, wherein the calculation processing unit acquires at least one of an overall value, an RMS value, and an average value as the vibration value.

15. The linear motion drive device according to claim 7, wherein the calculation processing unit acquires at least one of an overall value, an RMS value, and an average value as the vibration value.

16. The linear motion drive device according to claim 13, wherein the calculation processing unit acquires at least one of an overall value, an RMS value, and an average value as the vibration value.

17. The method for detecting decreased preload in the ball screw according to claim 1, wherein at the abnormality detection step, it is determined that a decrease in the preload has occurred in the ball screw when a difference between the vibration value acquired in the calculation processing step and a vibration value in an initial stage of the operation of the ball screw or during a normal operation of the ball screw exceeds a set value previously determined based on the vibration value in an initial stage of the operation of the ball screw or during a normal operation of the ball screw.

18. The linear motion drive device according to claim 5, wherein the ball screw further comprises each of the nut, the linear motion table, and a flange, wherein the nut is directly attached to the ball screw shaft, wherein both of the linear motion table and the acceleration sensor are attached to the ball screw shaft through the nut, and wherein the acceleration sensor is attached to the nut though the flange.

19. The method for detecting decreased preload in the ball screw according to claim 1, wherein a frequency band affected by a circulation vibration of the rolling bodies is outside of the specific frequency band.

\* \* \* \* \*